Patented Dec. 26, 1939

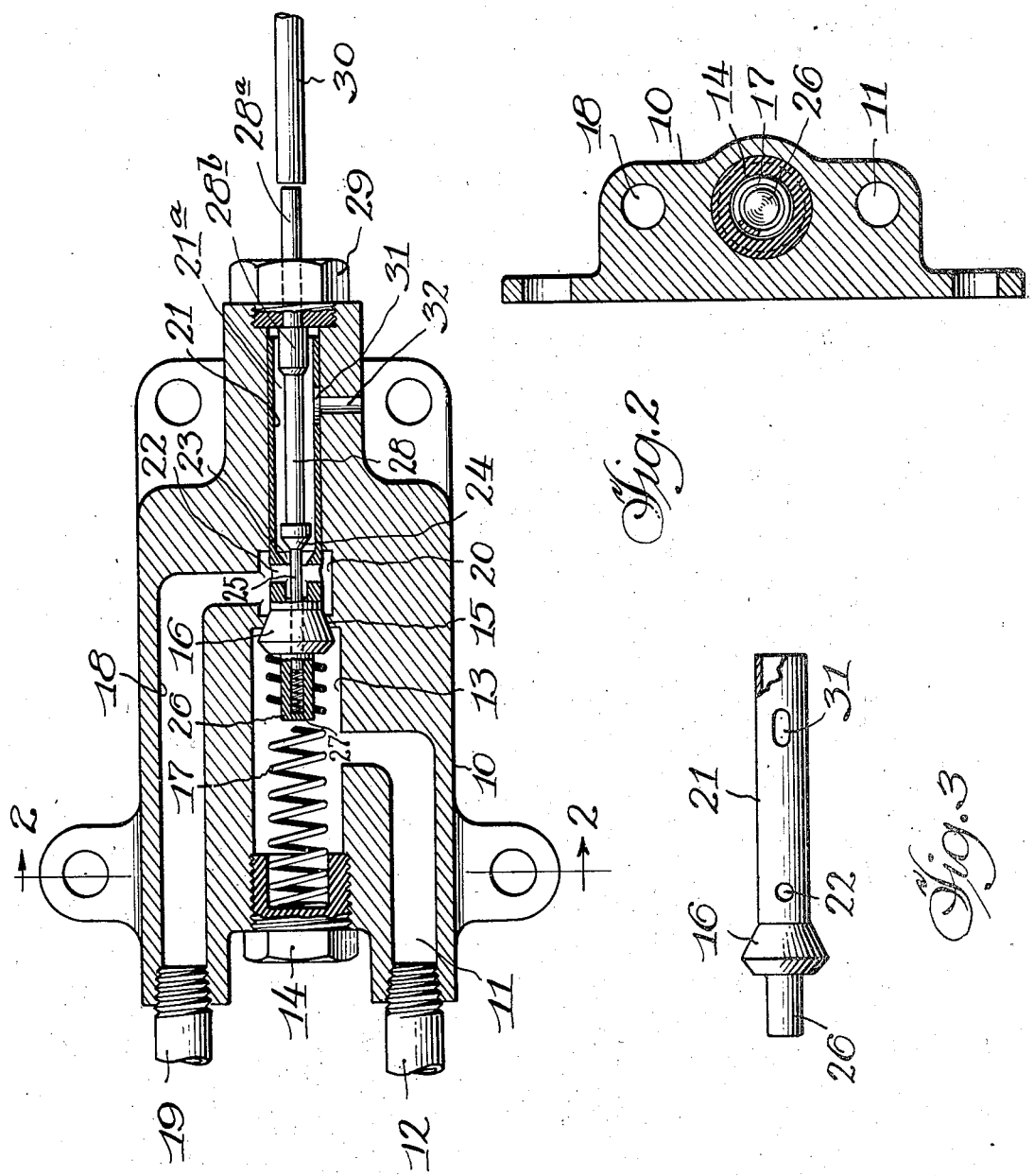

2,184,413

UNITED STATES PATENT OFFICE 2,184,413

PRESSURE FLUID CONTROL VALVE DEVICE

Alessandro D. Della Chiesa, New York, N. Y., and Louis P. Froehlich, East Rutherford, N. J., assignors to Binks Manufacturing Company, Chicago, Ill., a corporation of Delaware Original application March 11, 1936, Serial No. 68,344. Divided and this application February 17, 1939, Serial No. 256,974

2 Claims. (Cl. 277—21)

The present invention relates to a pressure fluid control device of the multi-way type whereby fluid under pressure is delivered in one direction for producing a desired effect and in another direction for exhaust or release. The embodiment selected to illustrate the invention is adapted particularly for use with spraying appliances in use with printing presses or the like, as set forth in our copending application Serial No. 68,344, filed March 11, 1936, now Patent No. 2,153,548, granted April 11, 1939, and of which this application is a division, the device of this application being especially designed to control the supply and exhaust of pressure or motive fluid for governing the operation of the spray gun or the like in such apparatus.

Among the objects of the invention is to provide a novel valve device so constructed as to supply fluid under pressure to the operated appliance, such as a spray gun, and to return and exhaust the fluid after operation of such appliance.

Another object is to provide a valve device having a main passage having a spring operated valve therein for controlling the passage of fluid, and an auxiliary or exhaust passage connected to the main passage, as on the discharge side of the valve thereof, and having an auxiliary valve means for controlling the exhaust of the fluid therethrough. One of the elements of the auxiliary valve means is connected to the movable element of the valve of the main passage and another of its elements is so movable in the exhaust passage by an actuating means as to first close the normally open auxiliary valve means and then to open the main valve against the forces of springs normally holding the main valve closed and the auxiliary valve means open. An opposite movement of the actuator permits the main valve to first close and the auxiliary valve means to open under the forces of the springs, there being a spring acting against an element of the auxiliary valve means to normally hold it open, such spring being weaker than the spring for the main valve.

Other objects, advantages, capabilities, features and the like are comprehended by the invention as will later appear and as are inherently possessed by the invention.

Referring to the drawing:

Fig. 1 is a longitudinal sectional view through a valve device constructed in accordance with the invention;

Fig. 2 is a transverse sectional view taken in a plane represented by line 2—2 of Fig. 1 of the drawing; and Fig. 3 is a plan view with a part in broken section of a detail of the device.

Referring more in detail to the drawing, the embodiment selected to illustrate the invention is shown as comprising a valve body 10 provided with a fluid inlet passage 11 to which is connected an inlet duct 12. The body 10 has a receiving chamber 13 closed at an end thereof by a plug 14. At the inner end of the chamber is provided a valve seat means 15 with which normally seats a main or control valve member 16. Against the valve member 16 acts a spring 17 located in the chamber 13 and normally holding the valve member 16 closed or to its seat 15, the spring 17 reacting against the plug 14.

At the other side of the valve means 15—16 and in alinement with the chamber 13 is located a delivery chamber 20 with which is connected a delivery passage 18 leading and connected to an outlet duct 19, the latter being connected to the operated appliance, such as a spray gun (not shown).

In alinement with the chamber 20 the body 10 is provided with a bore in which is slidably mounted a tubular extension 21 of the valve 16, this extension being connected to or rigid with the valve member 16. The extension is provided with a return chamber 22 which is always in communication with the chamber 20, and a chamber 21ª, between which chambers 21ª and 22 is provided an exhaust valve seat means 23 with which an exhaust valve element 24 is adapted to close and seat as later explained.

To the valve element 24 is connected a valve stem 26 which is axially slidable in the valve member 16 and which extends into the socket of a hub portion 26 of the valve member 16. A spring 27 is located in the hub portion 26 to act against the end of the stem 25 so as to normally hold the auxiliary valve member 24 in open or unseated position. To the valve element 24 is also connected a stem or rod 28 which has an enlargement 28ᵇ to provide a shoulder for abutting against the inner end of the plug 29 screwed into the end of the body 10, as shown. The stem 28 also has a reduced diameter portion 28ª which is slidable through the plug 29 and extends exteriorly for forcible engagement by a cam operated or actuated plunger 30, or even directly by the cam (not shown) itself.

The extension 21 is suitably provided with an elongated aperture 31 so located as to be always in communication with an exhaust or discharge passage 32 provided in the body 10.

In operation the cam or other actuating means operates either by way of the rod 30 or directly on the stem 28ª to first close the valve 23—24 against the force of the spring 27, and then move the extension 21 with the rigidly connected valve member 16 to open the valve 15—16 against the force of the spring 17; and when moving in the opposite direction to permit the valve 15—16 to first close, and the valve 23—24 to then open under the forces of the springs 17 and 27. In this way, the exhaust passage is first cut off and the pressure fluid passage opened to allow the pressure fluid to operate the operated appliance, and then the fluid passage is cut off and the fluid allowed to exhaust by way of the valve 23—24 and the discharge chamber 21ª and discharge passage or outlet 32.

While we have herein described and upon the drawings shown an embodiment of our invention, it is to be understood that our invention is not limited thereto, but comprehends other structures, constructions, details, arrangements of parts, features, and the like without departing from the spirit of the invention.

Having thus disclosed the invention, we claim:

1. A pressure fluid control valve device comprising a body provided with a receiving chamber, a delivery chamber, and a bore, a valve seat means between said chamber, a main valve means having a valve member for seating on said seat means and having an extension slidable in said bore, a spring in said receiving chamber and acting against said valve member for normally holding said valve member to its seat on the seat means, said extension comprising a return chamber, a discharge chamber and a valve seat means between said latter chambers, an auxiliary valve slidably carried by said extension and adapted to seat on said latter seat means, a spring carried by said main valve means and acting on said auxiliary valve for normally holding said auxiliary valve in open and unseated position, an abutment means carried by said body and so located as to act as a limit stop for said auxiliary valve when in open position, a discharge passage connected to said discharge chamber, said return chamber being in communication with said delivery chamber, and an actuating element so associated with said auxiliary valve as to move it in one direction to close said auxiliary valve and open said main valve member, and to permit the closing of said main valve member and open said auxiliary valve under the forces of said springs.

2. A pressure fluid control valve device comprising a body provided with fluid receiving and delivery chambers and with inlet and outlet passages connected respectively to said chambers, a main valve for controlling the passage of fluid between said chambers and having a spring pressed movable element, said body having a bored extension with the bore thereof extending from said delivery chamber, an exhaust valve operable in said bore and comprising relatively movable valve parts of which a valve part is connected with the movable main valve element to move therewith and another valve part is free from said main valve, a spring acting on said free valve part to normally hold the exhaust valve parts in open relation, said free valve part having a shouldered portion and an actuating portion projecting exteriorly of said body extension, said body extension having a shouldered portion to act as a stop for said shouldered portion of said free valve part, one of said valve parts having a discharge passage which communicates at one end thereof with said delivery chamber when said exhaust valve parts are in open relation and which has a discharge outlet near the other end thereof, said body extension having a discharge port in registry with said discharge outlet.

ALESSANDRO D. DELLA CHIESA.
LOUIS P. FROEHLICH.